United States Patent
Nadimpalli et al.

(10) Patent No.: US 11,756,297 B2
(45) Date of Patent: Sep. 12, 2023

(54) AUGMENTED REALTY BASED ASSISTANCE SYSTEM AND METHOD THEREOF

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 245 days.

(21) Appl. No.: 17/241,124

(22) Filed: Apr. 27, 2021

(65) Prior Publication Data

US 2022/0284217 A1 Sep. 8, 2022

(30) Foreign Application Priority Data

Mar. 3, 2021 (IN) .............................. 202141008993

(51) Int. Cl.
*G06K 9/00* (2022.01)
*G06V 20/40* (2022.01)
*G06N 3/08* (2023.01)
*G06N 3/04* (2023.01)
*G06F 3/01* (2006.01)

(52) U.S. Cl.
CPC .............. *G06V 20/41* (2022.01); *G06N 3/04* (2013.01); *G06N 3/08* (2013.01); *G06V 20/46* (2022.01); *G06F 3/011* (2013.01)

(58) Field of Classification Search
CPC ........ G06V 20/41; G06V 20/46; G06V 10/82; G06V 20/20; G06N 3/04; G06N 3/08; G06N 3/044; G06F 3/011
See application file for complete search history.

(56) References Cited

U.S. PATENT DOCUMENTS

| 10,535,202 | B2 | 1/2020 | Schmirler et al. | |
| 2014/0168262 | A1 | 6/2014 | Forutanpour et al. | |
| 2019/0057548 | A1* | 2/2019 | Singh | G09B 25/02 |
| 2019/0325660 | A1* | 10/2019 | Schmirler | G06F 3/011 |
| 2020/0342672 | A1* | 10/2020 | Schmelig | G06F 3/011 |

FOREIGN PATENT DOCUMENTS

| CN | 104834379 A | 8/2015 |
| CN | 106340217 B | 5/2017 |

* cited by examiner

*Primary Examiner* — Dhaval V Patel
(74) *Attorney, Agent, or Firm* — Finnegan, Henderson, Farabow, Garrett & Dunner, LLP (57) ABSTRACT

The disclosure relates to system and method for providing assistance to a user using augmented reality. The method includes acquiring a video stream and a set of data associated with a task being performed by a user, in real-time, using a camera and/or a sensor device. The video stream includes sequential frames. The method further includes determining a present state associated with the task based on the sequential frames using an Artificial Neural Network (ANN) based action prediction model; determining scenarios and events corresponding to the scenarios based on the video stream and the set of data using an ANN based augmented intelligence model; and determining sequential instructions required for assisting the user to accomplish the task, dynamically, based on the present state and the events associated with the task, using at least one of a rule-based engine and an ANN based instruction prediction model.

20 Claims, 4 Drawing Sheets

AUGMENTED REALTY BASED ASSISTANCE SYSTEM AND METHOD THEREOF

TECHNICAL FIELD

The present disclosure relates generally to augmented reality, and more particularly to system and method for providing assistance to a user using augmented reality.

BACKGROUND

In today's word, Augmented Reality (AR) has various applications in different fields, such as medical, business logistics, education, retail, and other areas. Usually, the AR devices are programmed with some instructions to perform various tasks. Further, the AR assisting devices may be used to provide guidance to users. The AR assisting devices enable the users to perform the tasks, even if a user lacks in prior knowledge related to a task to be performed. Thus, the AR devices guide inexperienced users to perform the task.

There are some available AR based systems that help the users by providing step wise guidance for performing actions to complete the task. Typically, the AR devices are programmed based on videos of experts performing tasks. Further, in some embodiments, procedures followed by the experts in the videos to perform tasks may be divided into multiple steps. After dividing into the steps, for each of the steps, instructions may be written and programmed into the AR devices. By way of an example, for repairing a laptop, the steps may include removing battery as step 1, removing back latch as step 2, removing hard disk as step 3, and so on. In this way, an AR device may be programmed with all these steps, which may further provide step wise guidance to a user to perform the intended task.

However, the existing systems provide guidance irrespective of external factors, which results inappropriate guidance. Hence, in case of change in external factors, the systems may provide improper instructions which may be inadequate or may not help the user to complete the task. Moreover, the existing systems fail to capture external factors which may affect a present state associated with the task. Therefore, there is a need of an assisting system that may capture the external factors intelligently and help the users to perform the tasks in an effective way.

SUMMARY

In one embodiment, a method of providing assistance to a user using augmented reality (AR) is disclosed. In one example, the method may include acquiring a video stream and a set of data associated with a task being performed by a user, in real-time, using at least one of a camera and a sensor device. Further, the video stream may include a plurality of sequential frames. The method may further include determining a present state associated with the task based on the plurality of sequential frames of the video stream using an Artificial Neural Network (ANN) based action prediction model. It should be noted that determining the present state may include extracting features from each of the plurality of sequential frames and generating feature vectors corresponding to the extracted features. The method may further include determining a plurality of scenarios and a plurality of events corresponding to the plurality of scenarios based on the video stream and the set of data, using an ANN based augmented intelligence model. The method may further include determining a plurality of sequential instructions required for assisting the user to accomplish the task, dynamically, based on the present state and the plurality of events associated with the task. At least one of a rule-based engine and an ANN based instruction prediction model may be used to determine the plurality of sequential instructions.

In another embodiment, a system for providing assistance to a user using AR is disclosed. In one example, the system may include a processor and a memory communicatively coupled to the processor. The memory may store processor-executable instructions, which, on execution, may cause the processor to acquire a video stream and a set of data associated with a task being performed by a user, in real-time, using at least one of a camera and a sensor device. Further, the video stream may include a plurality of sequential frames. The processor-executable instructions, on execution, may further cause the processor to determine a present state associated with the task based on the plurality of sequential frames of the video stream using an ANN based action prediction model. It should be noted that determining the present state may include extracting features from each of the plurality of sequential frames and generating feature vectors corresponding to the extracted features. The processor-executable instructions, on execution, may further cause the processor to determine a plurality of scenarios and a plurality of events corresponding to the plurality of scenarios based on the video stream and the set of data, using an ANN based augmented intelligence model. The processor-executable instructions, on execution, may further cause the processor to determine a plurality of sequential instructions required for assisting the user to accomplish the task, dynamically, based on the present state and the plurality of events associated with the task. At least one of a rule-based engine and an ANN based instruction prediction model may be used to determine the plurality of sequential instructions.

In yet another embodiment, a non-transitory computer-readable medium storing computer-executable instruction for providing assistance to a user using AR is disclosed. In one example, the stored instructions, when executed by a processor, may cause the processor to perform operations including acquiring a video stream and a set of data associated with a task being performed by a user, in real-time, using at least one of a camera and a sensor device. The video stream may include a plurality of sequential frames. The operations may further include determining a present state associated with the task based on the plurality of sequential frames of the video stream using an ANN based action prediction model. It should be noted that determining the present state may include extracting features from each of the plurality of sequential frames and generating feature vectors corresponding to the extracted features. The operations may further include determining a plurality of scenarios and a plurality of events corresponding to the plurality of scenarios based on the video stream and the set of data, using an ANN based augmented intelligence model. The operations may further include determining a plurality of sequential instructions required for assisting the user to accomplish the task, dynamically, based on the present state and the plurality of events associated with the task. At least one of a rule-based engine and an ANN based instruction prediction model is used to determine the plurality of sequential instructions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
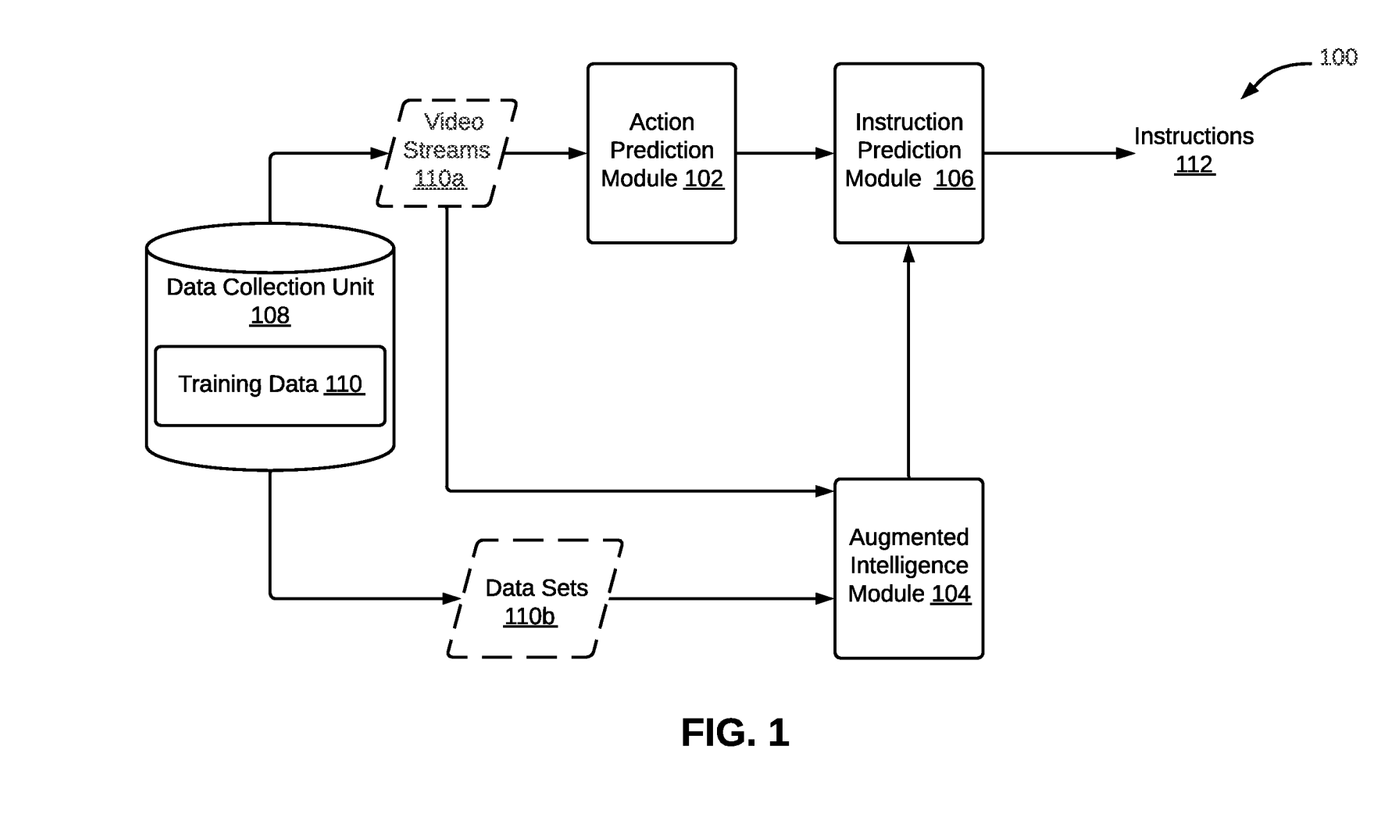
FIG. 1 is a block diagram of an exemplary system for training various modules within an Augmented Reality (AR) based assistance system, in accordance with some embodiments of the present disclosure.

Referring now to FIG. 1, a block diagram of an exemplary system 100 for training various modules 102-106 within an Augmented Reality (AR) based assistance system is illustrated, in accordance with some embodiments of the present disclosure. The system 100 may include an action prediction module 102, an augmented intelligence module 104, and an instruction prediction module 106. Further, the system 100 may include a data collection unit 108 that includes training data 110. The training data 110 may include a plurality of video streams 110a and data sets 110b, captured by cameras and/or sensors. The video streams 110a and the data sets 110b may be associated with a variety of tasks. Further, the training data 110 may be used to train the modules 102-106.

The action prediction module 102 may include an Artificial Neural Network (ANN) based action prediction model. Further, the ANN based action prediction model may correspond to a Recurrent Neural Network (RNN) model. In a training phase, the RNN model may be trained by providing the video streams 110a. It should be noted that each of the video streams 110a may include a plurality of sequential frames. In some embodiments, a video stream may include actions performed by users and/or objects, actions performed on objects, and various steps associated with the tasks. Further, the action prediction module 102 may be trained to understand contextual meaning of the video streams 110a and consequently to determine a present state for the tasks with great accuracy. After training, the action prediction module 102 may be capable of performing various operations including object detection in frames, identifying actions performed by/on the detected objects, and determining scene descriptions in the video streams 110a. Moreover, after training, the action prediction module 102 may be able to determine the present states for the variety of tasks and actions associated with the present states. Further, every time, predicted results by the action prediction module 102 may be sent to further the instruction prediction module 106, for training the instruction prediction module 106.

The augmented intelligence module 104 may act as an intelligence system that may help AR based assistance system to adapt various external changes. The augmented intelligence module 104 may include an ANN based augmented intelligence model. The augmented intelligence module 104 may be trained with the video streams 110a and the data sets 110b captured using cameras/sensors. The video streams 110a and the data sets 110b may include information related to various scenarios. A trained augmented intelligence module may be capable of determining scenarios and events corresponding to the scenarios. An event may include information about a scenario, information related to malfunctioning of an object and associated solution, and a required change in a Standard Operating Procedure (SOP). It should be noted that the required change in the SOP may include, but not limited to, adding new steps to the SOP, removing steps from the SOP, modifying the steps of SOP, and skipping some steps of the SOP. In some embodiments, the augmented intelligence module 104 may be trained to determine various possible scenarios along with corresponding events. Further, the determined events and the scenarios may be sent to the instruction prediction module 106 for computation of valid instructions 112 to users. It should be noted that various results generated by the action prediction module 102 and the augmented intelligence module 104 may be provided to the instruction prediction module 106 as training data.

The instruction prediction module 106 may include at least one of a rule-based engine and an ANN based instruction prediction model. In some embodiments the ANN based instruction prediction model of the instruction prediction module 106 may be trained to determine the plurality of sequential instructions 112. In training phase, the instruction prediction module 106 may receive the training data including the present states predicted by the action prediction module 102 along with the scenarios and events determined by the augmented intelligence module 104. In case, the instruction prediction module 106 is provided with only the determined present states (i.e., when events are not generated by the augment intelligence module 104), the instruction prediction module 106 may be trained to generate results based on the present states. Otherwise, the instruction prediction module 106 may be trained to predict results based on the present states and events. Hence, the instruction prediction module 106 may adapt according to situation and determine the instructions 112 for the users.

Figure 2:
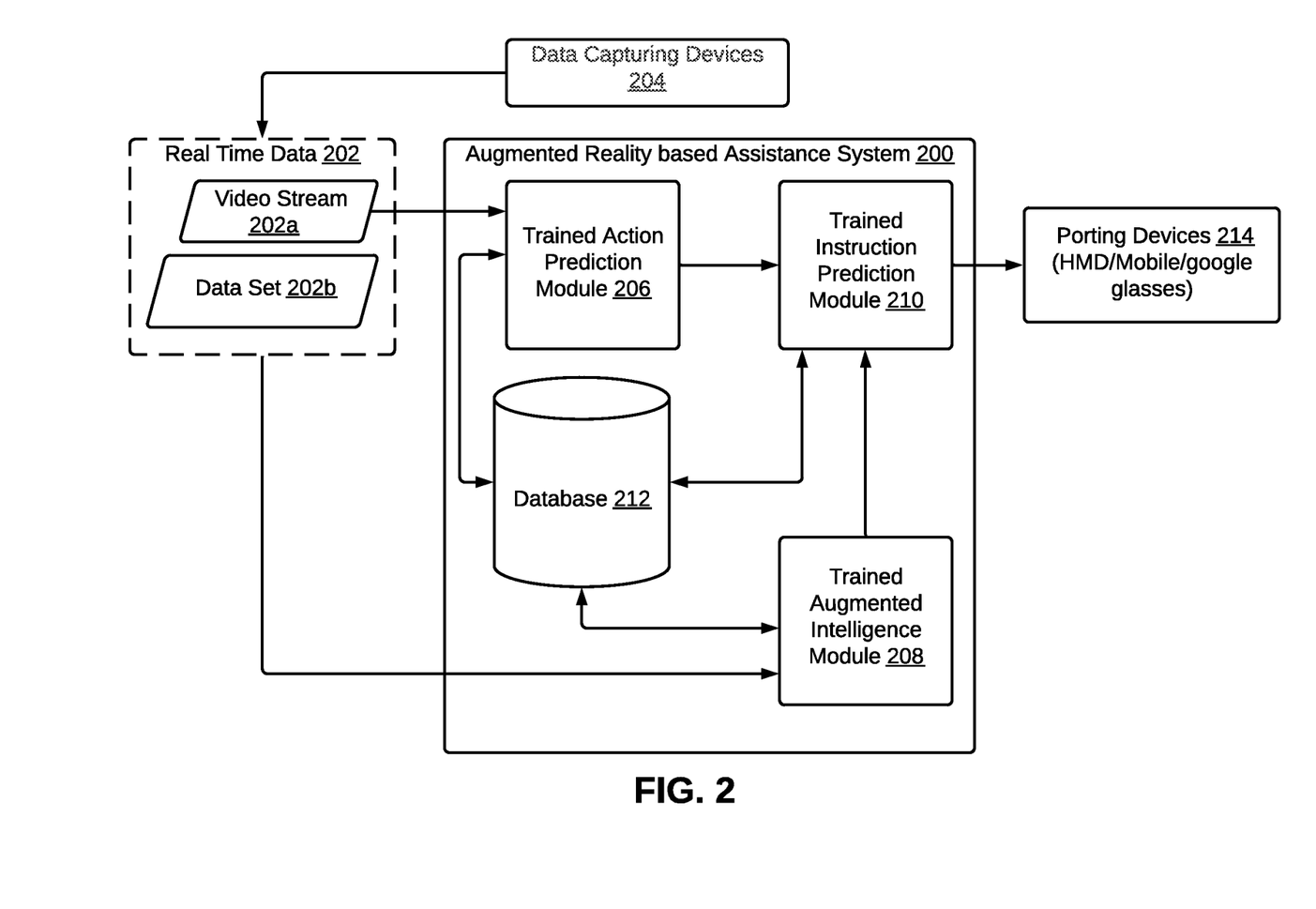
FIG. 2 is a functional block diagram of an exemplary AR based assistance system for providing assistance to a user, in accordance with some embodiments of the present disclosure.

Referring now to FIG. 2, a block diagram of an exemplary AR based assistance system 200 for providing assistance to a user is illustrated, in accordance with some embodiments of the present disclosure. The AR based assistance system 200 may determine a plurality of sequential instructions considering changes in external factors. For example, when the external factors change significantly, the AR based assistance system 200 may compute a scenario and generate an event corresponding to the scenario, and based on that dynamically provides instructions for performing a particular task to the user.

In order to provide assistance, the AR based assistance system 200 may acquire real time data 202 including a video stream 202a and a dataset 202b associated with a task being performed by the user. It should be noted that the real time data 202 may be acquired using data capturing devices 204 such as, a camera, and a sensor. The AR based assistance system 200 may include a trained action prediction module 206, a trained augmented intelligence module 208, and a trained instruction prediction module 210. Further, the AR based assistance system 200 may also include a database 212 to store various data and intermediate results generated by the modules 206-210. It should be noted that FIG. 2 is explained in conjunction with FIG. 1.

The trained action prediction module 206 may include a trained RNN model (i.e., a trained ANN based action prediction model). The trained action prediction module 206 may be configured to receive the video stream 202a, in real time. The video stream 202a may include a plurality of sequential frames. In some embodiments, the trained action prediction module 206 may determine a contextual meaning of the video stream 202a based on actions performed by/on a user/object in the video stream 202a. Further, the trained action prediction module 206 may determine a state (i.e., a present state) associated with the task and actions associated with the present state. The trained action prediction module 206 may perform various operation including object detection in the plurality of frames, identifying action performed by/on the detected objects, and determining a scene description. In some embodiments, the trained action prediction module 206 may extract features from the plurality of frames and based on that generate feature vectors. By performing all these operations, the trained action prediction module 206 may determine the present state associated with the task. The present state may be then transmitted to further to determine the plurality of sequential instructions.

For example, when a user pushes a lever down in a video stream, the trained action prediction module 206 may detect the "lever" as an object. Further, the identified action on the lever may be "push down" and determined scene description may be "lever is pushed down". Based on this scene the present state and state information may be sent to the trained instruction prediction module 210. The trained action prediction module 206 may be communicatively coupled to the trained instruction prediction module 210 and the database 212.

The trained augmented intelligence module 208 may be configured to collect data (i.e., the video stream 202a and the dataset 202b) from camera/sensor. Based on the video stream 202a and the dataset 202b, the trained augmented intelligence module 208 may determine a plurality of scenarios and a plurality of events corresponding to the plurality of scenarios. The trained augmented intelligence module 208 may help the trained instruction prediction module 210 to adapt the external changes. Once the video stream 202a and the dataset 202b from camera/sensor is received, the plurality of scenarios and corresponding events may be determined by the trained augmented intelligence module 208. In an embodiment, an event may include information related to a scenario including malfunctioning of an object and associated solution, and a required change in a Standard Operating Procedure (SOP), which may be further sent to the trained instruction module 210. The trained augmented intelligence module 208 may be operatively coupled to the trained instruction prediction module 210 and the database 212, as illustrated in FIG. 2.

The trained instruction prediction module 210 may receive inputs including the present state and actions associated with the present state from the trained action prediction module 206, and the plurality of events determined by the augmented intelligence module 208. Based on both the inputs, the trained instruction prediction module 210 may determine the plurality of sequential instructions. The plurality of instructions may further be transmitted to the user for assisting the user through various porting devices 214 such as, head mounted devices, mobiles, and the like. The plurality of sequential instructions may be required by the user to effectively complete the task (for example, to complete a repair/maintenance work).

By way example, consider a situation where a present state and an event regarding a broken nut may be determined. In that case, based on both the inputs (i.e., the present state and the event), the trained instruction prediction module 210 may determine a sequence of instructions to replace the broken nut. Hence, the AR based assistance system 200 includes the trained augmented Intelligence module 208 to capture changes dynamically and the trained instruction prediction module 210 to determine instructions accordingly. Further, the plurality of instructions may be transmitted to various connected porting devices 214. Examples of the porting devices 214 may include, but not limited to, Head Mounted Display (HMD) devices, mobile, and google glasses. Further, the porting devices 214 may visualize the plurality of instructions and help the user to perform the task.

By way of an example, consider a task related to repair and maintenance work. In that case, the AR based assistance system 200 may acquire a video stream including steps of repairing, in real time. The AR based assistance system 200 may determine a SOP for repairing. On the other hand, due to external changes, the system 200 may determine required change in the SOP to complete the task (i.e., repairing process). And, based on that, the system 200 may provide instructions to the user. Further, in some embodiments, external changes may be captured using a camera and a sensor device. The AR based assistance system 200 may use augmented intelligence to analyze external conditions that may be helpful in modifying the instructions dynamically and to generate intended results of repair and maintenance work.

Figure 3:
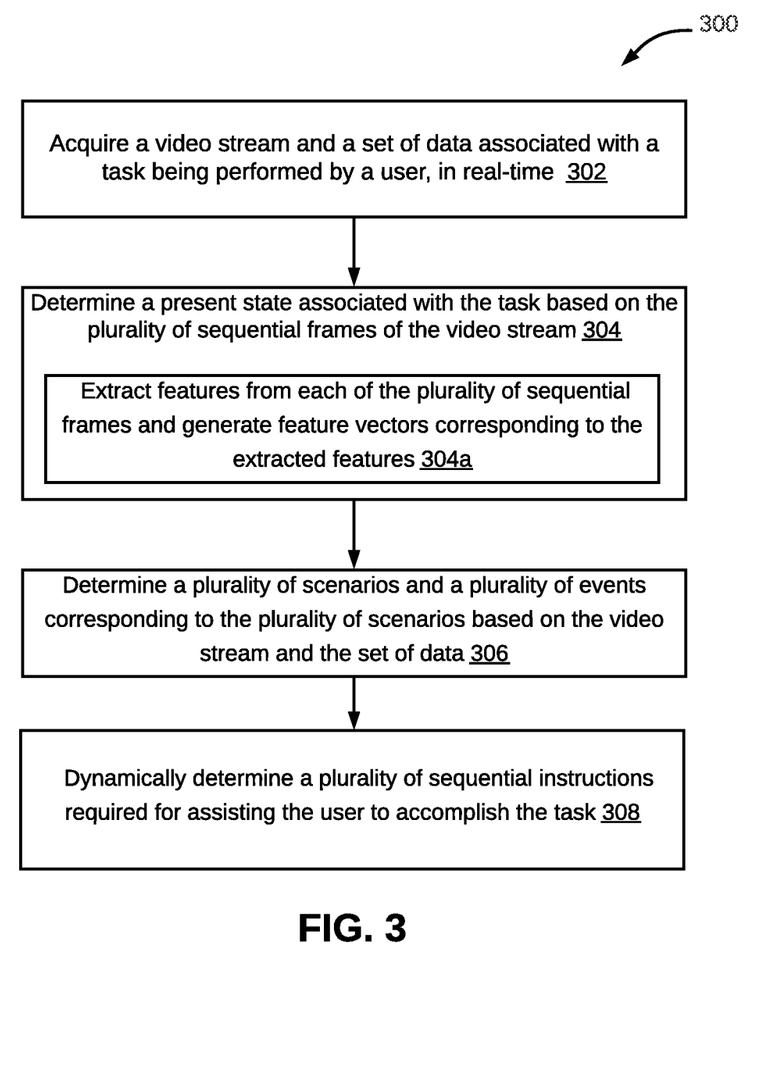
FIG. 3 is a flow diagram of an exemplary process for providing assistance to a user using AR, in accordance with some embodiments of the present disclosure.

Referring now to FIG. 3, an exemplary process 300 for providing assistance to a user using AR is depicted via a flow chart, in accordance with some embodiments of the present disclosure. Each step of the process 300 may be performed by an AR based assistance system (analogous to the AR based assistance system 200). FIG. 3 is explained in conjunction with FIG. 1 and FIG. 2.

As illustrated in the process 300, at step 302, a video stream and a set of data may be acquired in real-time. The video stream and the set of data may be associated with a task being performed by a user. The video stream may include a plurality of sequential frames. Moreover, in some embodiments, the video streams may be split into the plurality of sequential frames. Further, during a training phase, a data collection unit (same as the data collection unit 108, illustrated in FIG. 1) may be used to acquire training data involving various steps to perform a task along with a video stream associated with the task. In other words, the steps and data from the video stream may utilized to train various modules, such as the action prediction module 102, and the augmented intelligence module 104. During the training phase, an offline video stream may be divided into individual sequential frames/images. The images may be sequenced as:

$I=(I_1, I_2, I_3, \ldots, I_n)$, where '$I_i$' is ordered sequence of images, for i=1, 2, ... n Further, during a testing phase, a real time video stream associated with a task may be acquired, and then the video stream may be split into sequential frames and images. In that case, the images may be sequenced as:

$I=(IR_1, IR_2, IR_3, \ldots, IR_n)$, where '$IR_n$' is ordered sequence of images for i=1, 2, ... n At step 304, a present state associated with the task may be determined. It should be noted that the present state may be determined based on the plurality of sequential frames of the video stream. To determine the present state, the AR based assistance system may include an ANN based action prediction model. Further, at step 304a, features may be extracted from each of the plurality of sequential frames, and feature vectors corresponding to the extracted features may be generated.

During the training phase, the ANN based action prediction model (for example, an RNN model) may be trained with the sequence of frames/images to determine the present state and action associated with the task. This may be done by passing the frames to the ANN based action prediction model. The AAN based action prediction model may extract the features from the frames. The features may further be used to determine the present state.

In some embodiments, a plurality of objects may be detected in each of the plurality sequential frames of the video stream, and actions performed by/on one or more of the plurality objects may be identified, based on the extracted features. It should be noted that the actions may be identified in each of the plurality sequential frames of the video stream. Further, in some embodiments, a scene description in the plurality of sequential frames of the video stream may be determined for state determination, based on the extracted features. Additionally, in some embodiments, contextual meaning of the video stream, and a Standard Operating Procedure (SOP) may be determined. It should be noted that the SOP may include standard steps to perform the task.

Further, during the testing phase, the sequential frames may be collected from the real time video stream and sent to a trained action prediction module (same as the trained action prediction module 206) that may extract various features to determine feature vectors and further determine the present state. An ordered sequence of feature vectors generated based on the frames/images is given by:

Let $F=\{F_1, F_2, F_3, \ldots, F_n\}$, for $i=1, 2, \ldots, n$ $F_1=(F_{11}, F_{12}, \ldots, F_{1n})$, where '$F_{1i}$' is $i^{th}$ feature extracted from the first frame, $F_2=(F_{21}, F_{22}, \ldots, F_{2n})$, where '$F_{2i}$' is $i^{th}$ feature extracted from the second frame, $F_n=(F_{n1}, F_{n2}, \ldots, F_{nn})$, where '$F_{ij}$' is $i^{th}$ feature extracted from the $j^{th}$ frame In this way, features for each and every frame may be obtained for object detection, action prediction, scene description determination, and state determination.

Finally, a state (i.e., the present state) may be obtained. The present state may be a function of features and represented by a symbol 'S' i.e., $S=(F_1, F_2, \ldots, F_n)$, which may be further used to determine the instructions.

At step 306, a plurality of scenarios and a plurality of events corresponding to the plurality of scenarios may be determined based on the video stream and the set of data. Further, an ANN based augmented intelligence model may be used for determining the plurality of scenarios and the plurality of events. It may be noted that an event corresponding to a scenario may include an information with respect to the scenario, information related to malfunctioning of an object and associated solution, and a required change in a Standard Operating Procedure (SOP).

During the training phase, the ANN based augmented intelligence model may be trained based on collected data from external camera/sensor. Thus, the trained ANN based augmented intelligence model may be capable to determine a particular scenario and an event for that scenario. The event may include information of the scenario including a change (for example, malfunctioning of objects), solution for rectifying the problem. The generated events further may be sent to an instruction prediction module.

Further, during the testing phase, a real time data set from external camera/sensor devices may be directly transmitted to the trained instruction prediction module. An ordered sequence of real time camera/sensor information may be given as:

$SR=(SR_1, SR_2, SR_3, \ldots, SR_n)$, where $i=1, 2, 3, \ldots, n$.

This information or data streams may be sent to the trained augmented intelligence model. The trained augmented intelligence prediction model may determine the scenario and corresponding event. Examples of the generated events for various tasks may include, but not limited to, a fallen down screw, a broken wind wheel while repairing, and the like.

At step 308, a plurality of sequential instructions may be determined, dynamically, based on the present state and the plurality of events associated with the task. The plurality of instructions may be required by the user to accomplish the task. Further, a rule-based engine or an ANN based instruction prediction model may be employed to determine the plurality of sequential instructions. In some embodiments, a new state may be determined for the task to be performed by the user. The identification of the new state may be executed by identifying at least one change in context of the video stream with respect to the plurality of events.

In the training phase, the instruction prediction model may be trained based on datasets (including the present states and the events) determined by the action prediction model and the augmented intelligence model. Further, in the testing phase, the event generated by the trained augmented intelligence model and the present state may be used to determine the plurality of instructions. The plurality of instructions may be given as:

$$I=f(S,E)$$

where 'I' indicates instructions provided to the user, 'S' indicates a state associated with the task, and 'E' represents an event generated by augmented intelligence model. Once the instructions are determined, the instructions may be further fed to the user via porting or AR devices, such as head mounted devices, mobiles, and the like. Based on the provided instructions, the user may be capable of completing the task effectively.

The present disclosure may provide many advantages in order to overcome the problems encountered in conventional systems and methods. As discussed above, the present disclosure dynamically provides instructions to a user based on real time data. Moreover, the disclosure uses augmented intelligence to capture change in external parameters, thereby provides effective results. For example, changes in external parameter are prominent in a task related to repair and maintenance. In that case also, the disclosed system may generate effective results. As, the system includes an augmented intelligence model to capture the external parameters and identifies required change in a procedure to complete the task effectively.

Figure 4:
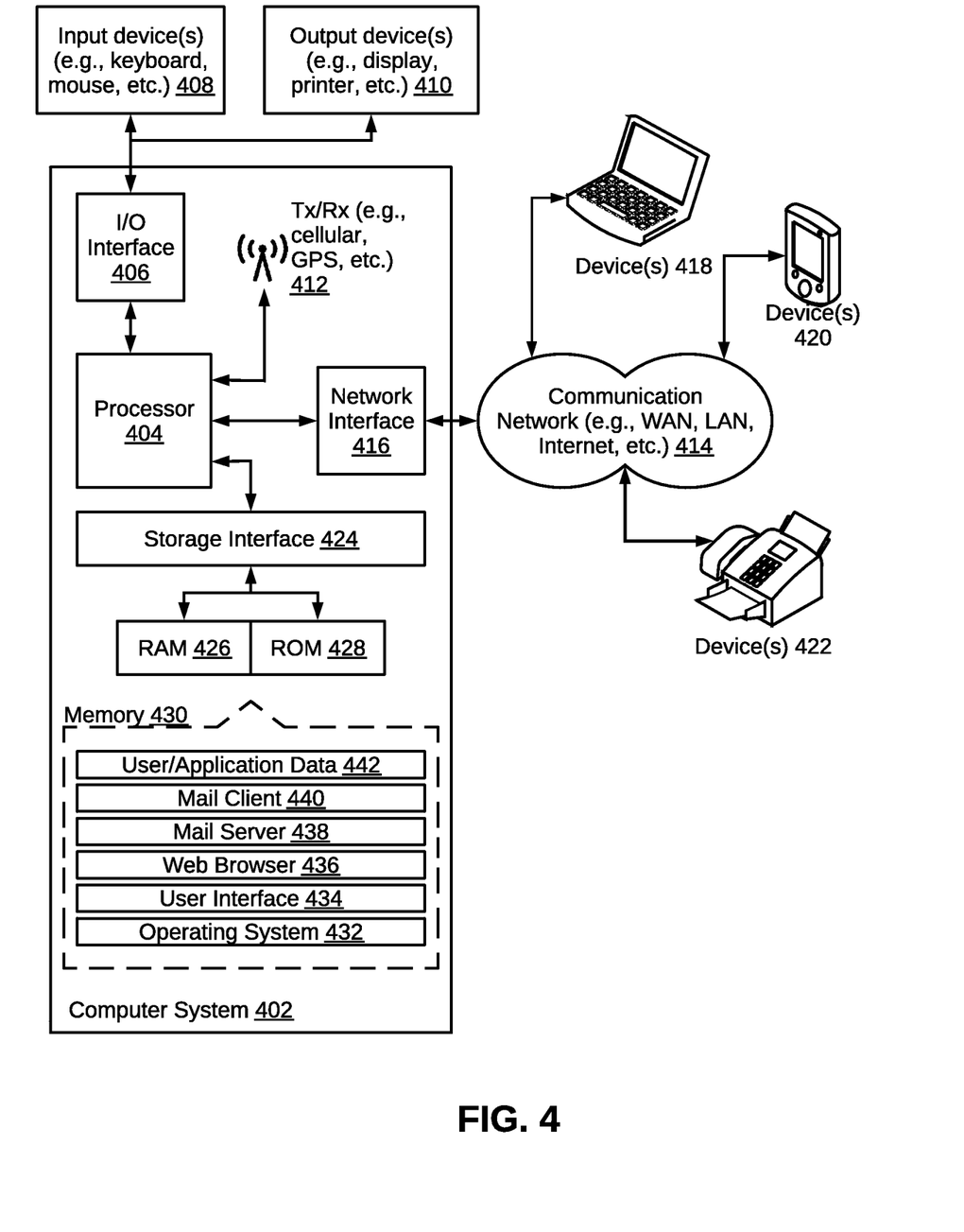
FIG. 4 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 402 for implementing embodiments consistent with the present disclosure is illustrated. Variations of computer system 402 may be used for implementing the AR based assistance system 200 for providing assistance to a user using augmented reality. The computer system 402 may include a central processing unit ("CPU" or "processor")

404. Processor 404 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 404 may be disposed in communication with one or more input/output (I/O) devices via I/O interface 406. The I/O interface 406 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 406, the computer system 402 may communicate with one or more I/O devices. For example, the input device 408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 410 may be a printer, fax machine, video display (e.g., cathode ray tube (CRT), liquid crystal display (LCD), light-emitting diode (LED), plasma, or the like), audio speaker, etc. In some embodiments, a transceiver 412 may be disposed in connection with the processor 404. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 404 may be disposed in communication with a communication network 414 via a network interface 416. The network interface 416 may communicate with the communication network 414. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 414 may include, without limitation, a direct interconnection, local area network (LAN), wide area network (WAN), wireless network (e.g., using Wireless Application Protocol), the Internet, etc. Using the network interface 416 and the communication network 414, the computer system 402 may communicate with devices 418, 420, and 422. These devices may include, without limitation, personal computer(s), server(s), fax machines, printers, scanners, various mobile devices such as cellular telephones, smartphones (e.g., APPLE® PHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 402 may itself embody one or more of these devices.

In some embodiments, the processor 404 may be disposed in communication with one or more memory devices (e.g., RAM 426, ROM 428, etc.) via a storage interface 424. The storage interface 424 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 432, user interface application 434, web browser 436, mail server 438, mail client 440, user/application data 442 (e.g., any data variables or data records discussed in this disclosure), etc. The operating system 432 may facilitate resource management and operation of the computer system 402. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOGGLE® ANDROID®, BLACKBERRY® OS, or the like. User interface 434 may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 402 may implement a web browser 436 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 402 may implement a mail server 438 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 402 may implement a mail client 440 stored program component. The mail client 440 may be a mail viewing application, such as APPLE MAIL®, MICROSOFT ENTOURAGE®, MICROSOFT OUTLOOK®, MOZILLA THUNDERBIRD®, etc.

In some embodiments, computer system 402 may store user/application data 442, such as the data, variables, records, etc. (e.g., training dataset, test dataset, deep learning model, correctly predicted test dataset, incorrectly predicted test dataset, neuron activation patterns data, activation vectors data, prediction validation model, input data, prediction/determined data, verdict data, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described system and method for providing assistance to a user using augmented reality. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing assistance to a user using augmented reality (AR), the method comprising:
    acquiring, by an AR based assistance system, a video stream and a set of data associated with a task being performed by a user, in real-time, using at least one of a camera and a sensor device, wherein the video stream comprises a plurality of sequential frames;
    determining, by the AR based assistance system, a present state associated with the task based on the plurality of sequential frames of the video stream using an Artificial Neural Network (ANN) based action prediction model, wherein determining the present state comprises extracting features from each of the plurality of sequential frames and generating feature vectors corresponding to the extracted features;
    determining, by the AR based assistance system, a plurality of scenarios and a plurality of events corresponding to the plurality of scenarios based on the video stream and the set of data, using an ANN based augmented intelligence model; and
    determining, by the AR based assistance system, a plurality of sequential instructions required for assisting the user to accomplish the task, dynamically, based on the present state and the plurality of events associated with the task, wherein at least one of a rule-based engine and an ANN based instruction prediction model is used to determine the plurality of sequential instructions.

2. The method of claim 1, wherein acquiring the video stream further comprises splitting the video stream into the plurality of sequential frames.

3. The method of claim 1, wherein determining the present state associated with the task comprises:
    detecting, by the AR based assistance system, a plurality of objects in each of the plurality sequential frames of the video stream;
    identifying, by the AR based assistance system, at least one of actions performed by one or more of the plurality objects and actions performed on one or more of the plurality of objects, in each of the plurality sequential frames of the video stream; and determining, by the AR based assistance system, a scene description in the plurality of sequential frames of the video stream.

4. The method of claim 3, further comprising determining contextual meaning of the video stream and a Standard Operating Procedure (SOP), wherein the SOP comprises a plurality of standard steps for the task.

5. The method of claim 1, wherein an event corresponding to a scenario comprises information with respect to the scenario, information related to malfunctioning of an object and associated solution, and a required change in a Standard Operating Procedure (SOP).

6. The method of claim 1, wherein determining the plurality of sequential instructions further comprises determining a new state for the task to be performed by the user by identifying at least one change in context of the video stream with respect to the plurality of events.

7. The method of claim 1, further comprising training the action prediction model based on video content comprising a set of video streams, and the augmented intelligence model based a dataset captured by cameras and sensors.

8. The method of claim 1, further comprising training the instruction prediction model based on datasets determined by the action prediction model and the augmented intelligence model.

9. A system for providing assistance to a user using augmented reality, the system comprising:
a processor; and
a memory communicatively coupled to the processor, wherein the memory stores processor-executable instructions, which, on execution, cause the processor to:
acquire a video stream and a set of data associated with a task being performed by a user, in real-time, using at least one of a camera and a sensor device, wherein the video stream comprises a plurality of sequential frames;
determine a present state associated with the task based on the plurality of sequential frames of the video stream using an Artificial Neural Network (ANN) based action prediction model, wherein determining the present state comprises extracting features from each of the plurality of sequential frames and generating feature vectors corresponding to the extracted features;
determine a plurality of scenarios and a plurality of events corresponding to the plurality of scenarios based on the video stream and the set of data, using an ANN based augmented intelligence model; and
determine a plurality of sequential instructions required for assisting the user to accomplish the task, dynamically, based on the present state and the plurality of events associated with the task, wherein at least one of a rule-based engine and an ANN based instruction prediction model is used to determine the plurality of sequential instructions.

10. The system of claim 9, wherein the processor-executable instructions further cause the processor to acquire the video stream by splitting the video stream into the plurality of sequential frames.

11. The system of claim 9, wherein the processor-executable instructions further cause the processor to determine the present state associated with the task by:
detecting a plurality of objects in each of the plurality sequential frames of the video stream;
identifying at least one of actions performed by one or more of the plurality objects and actions performed on one or more of the plurality of objects, in each of the plurality sequential frames of the video stream; and
determining a scene description in the plurality of sequential frames of the video stream.

12. The system of claim 11, wherein the processor-executable instructions further cause the processor to further determine contextual meaning of the video stream and a Standard Operating Procedure (SOP), wherein the SOP comprises a plurality of standard steps for the task.

13. The system of claim 9, wherein an event corresponding to a scenario comprises information with respect to the scenario, information related to malfunctioning of an object and associated solution, and a required change in a Standard Operating Procedure (SOP).

14. The system of claim 9, wherein the processor-executable instructions further cause the processor to determine the plurality of sequential instructions by determining a new state for the task to be performed by the user by identifying at least one change in context of the video stream with respect to the plurality of events.

15. The system of claim 9, wherein the processor-executable instructions further cause the processor to train the action prediction model based on video content comprising a set of video streams, and the augmented intelligence model based a dataset captured by cameras and sensors.

16. The system of claim 9, wherein the processor-executable instructions further cause the processor to train the instruction prediction model based on datasets determined by the action prediction model and the augmented intelligence model.

17. A non-transitory computer-readable medium having stored thereon a set of computer-executable instructions for providing assistance to a user using augmented reality, the set of computer-executable instructions causing a computer comprising one or more processors to perform steps comprising:
acquiring a video stream and a set of data associated with a task being performed by a user, in real-time, using at least one of a camera and a sensor device, wherein the video stream comprises a plurality of sequential frames;
determining a present state associated with the task based on the plurality of sequential frames of the video stream using an Artificial Neural Network (ANN) based action prediction model, wherein determining the present state comprises extracting features from each of the plurality of sequential frames and generating feature vectors corresponding to the extracted features;
determining a plurality of scenarios and a plurality of events corresponding to the plurality of scenarios based on the video stream and the set of data, using an ANN based augmented intelligence model; and
determining a plurality of sequential instructions required for assisting the user to accomplish the task, dynamically, based on the present state and the plurality of events associated with the task, wherein at least one of a rule-based engine and an ANN based instruction prediction model is used to determine the plurality of sequential instructions.

18. The non-transitory computer-readable medium of claim 17, wherein determining the present state associated with the task comprises:
detecting a plurality of objects in each of the plurality sequential frames of the video stream;
identifying at least one of actions performed by one or more of the plurality objects and actions performed on one or more of the plurality of objects, in each of the plurality sequential frames of the video stream;

determining a scene description in the plurality of sequential frames of the video stream; and determining contextual meaning of the video stream and a Standard Operating Procedure (SOP), wherein the SOP comprises a plurality of standard steps for the task.

19. The non-transitory computer-readable medium of claim 17, wherein determining the plurality of sequential instructions further comprises determining a new state for the task to be performed by the user by identifying at least one change in context of the video stream with respect to the plurality of events.

20. The non-transitory computer-readable medium of claim 17, wherein the steps further comprise:

training the action prediction model based on video content comprising a set of video streams, and the augmented intelligence model based a dataset captured by cameras and sensors; and training the instruction prediction model based on datasets determined by the action prediction model and the augmented intelligence model.

\* \* \* \* \*